United States Patent
Balogh et al.

(10) Patent No.: US 12,553,701 B2
(45) Date of Patent: Feb. 17, 2026

(54) SYSTEMS AND METHODS FOR MEASURING REAL TIME BATTERY DILATION

(71) Applicant: GM GLOBAL TECHNOLOGY OPERATIONS LLC, Detroit, MI (US)

(72) Inventors: Michael P. Balogh, Novi, MI (US); William Osad, Macomb, MI (US); Andrew J. Galant, Shelby Township, MI (US); Niccolo Jimenez, Troy, MI (US); Alexander Millerman, Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 524 days.

(21) Appl. No.: 18/087,452

(22) Filed: Dec. 22, 2022

(65) Prior Publication Data
US 2024/0210157 A1    Jun. 27, 2024

(51) Int. Cl.
*G01B 7/24*    (2006.01)
*G01R 31/382*    (2019.01)
(Continued)

(52) U.S. Cl.
CPC ............ *G01B 7/24* (2013.01); *G01R 31/382* (2019.01); *H01M 10/48* (2013.01); *H01M 50/109* (2021.01)

(58) Field of Classification Search
CPC ..... G01B 7/24; G01R 31/382; H01M 50/109; H01M 10/48
See application file for complete search history.

(56) References Cited

U.S. PATENT DOCUMENTS 10,312,555 B2   6/2019   Fukuda et al.
10,656,233 B2   5/2020   Morrison et al.
(Continued)

FOREIGN PATENT DOCUMENTS

DE   102017215144 A1   2/2019
DE   112018007256 T5   11/2020
(Continued)

OTHER PUBLICATIONS

Machine Translation of EP-3933956-A1 (Jun. 24, 2025) (Year: 2025).*
U.S. Appl. No. 18/087,452, Balogh et al.
(Continued)

*Primary Examiner* — Matthew J Merkling

(57) ABSTRACT

A system for measuring battery dilation. The system includes a battery cell, a magnet, and a magnetic force sensor. One of the magnet and the magnetic force sensor moves in response to expansion of the battery cell during dilation of the battery cell. The other of the magnet and the magnetic force sensor is stationary relative to the battery cell. The magnetic force sensor is configured to sense a change in magnetic force strength between the magnet and the magnetic force sensor. A control module is in communication with the magnetic force sensor. The control module is configured to measure degree of dilation of the battery cell based on the change in the magnetic force strength between the magnet and the magnetic force sensor. The magnetic force strength between the magnet and the magnetic force sensor changes as the battery cell expands during dilation.

17 Claims, 10 Drawing Sheets

(51) Int. Cl.
    *H01M 10/48*     (2006.01)
    *H01M 50/109*     (2021.01)

(56) References Cited

U.S. PATENT DOCUMENTS

| | | |
|---|---|---|
| 2014/0370361 A1* | 12/2014 | Cheong ............ H01M 10/0567 |
| | | 429/144 |
| 2016/0064780 A1 | 3/2016 | Jarvis et al. |
| 2017/0077561 A1* | 3/2017 | Fukuda ............... H01M 10/482 |
| 2017/0092997 A1* | 3/2017 | Fukuda .................... G01B 7/24 |
| 2018/0156605 A1 | 6/2018 | Swallow et al. |
| 2020/0333376 A1 | 10/2020 | Graf et al. |

FOREIGN PATENT DOCUMENTS

| | | |
|---|---|---|
| DE | 102021202154 A1 | 9/2022 |
| DE | 102021212386 A1 | 5/2023 |
| DE | 102022106393 A1 | 9/2023 |
| DE | 102023120823 A1 | 6/2024 |
| EP | 3933956 A1 * | 1/2022 |
| KR | 20080109121 A | 12/2008 |

OTHER PUBLICATIONS

German Office Action from counterpart DE1020241038926, dated Aug. 27, 2024.
German Office Action from counterpart DE1020241008180, dated Aug. 27, 2024.
U.S. Appl. No. 18/526,610, filed Dec. 1, 2023, Schmidt et al.
U.S. Appl. No. 18/305,075, filed Apr. 21, 2023, Balogh et al.

\* cited by examiner

SYSTEMS AND METHODS FOR MEASURING REAL TIME BATTERY DILATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for measuring real time battery dilation.

Battery cell dilation is a phenomenon that occurs gradually over time as a battery is repeatedly run through charge and discharge cycles. As a battery charges and discharges, chemical reactions inside the battery cell may cause the electrodes to expand. This expansion may cause the cell to become slightly larger, a process known as dilation. Monitoring dilation of a lithium ion battery is useful for avoiding electrode dry out, improving battery cell life, cell engineering, estimating energy density, and for designing battery modules and packs.

SUMMARY

In a feature, the present disclosure includes a system for measuring battery dilation. The system includes a battery cell, a magnet, and a magnetic force sensor. One of the magnet and the magnetic force sensor moves in response to expansion of the battery cell during dilation of the battery cell. The other of the magnet and the magnetic force sensor is stationary relative to the battery cell. The magnetic force sensor is configured to sense a change in magnetic force strength between the magnet and the magnetic force sensor. A control module is in communication with the magnetic force sensor. The control module is configured to measure degree of dilation of the battery cell based on the change in the magnetic force strength between the magnet and the magnetic force sensor. The magnetic force strength between the magnet and the magnetic force sensor changes as the battery cell expands during dilation.

In further features, the battery cell is a coin cell including a housing. Within the housing is a first electrode, a second electrode, and a separator between the first electrode and the second electrode. The magnet is adjacent to the second electrode and configured to move away from the magnetic force sensor as at least one of the first electrode and the second electrode expands during dilation. A biasing member is between the magnet and an inner surface of the housing. The biasing member holds the magnet against the second electrode and is flexible to accommodate movement of the magnet as at least one of the first electrode and the second electrode expands during dilation. The magnetic force sensor is external to the housing.

In further features, the magnetic force sensor includes one of a spherical magnet, a hemispherical magnet, and a conical magnet.

In further features, the magnetic force sensor includes one of a load sensor, a strain gauge, a pressure sensor, an electromagnetic force restoration sensor.

In further features, the magnetic force sensor includes one of a Hall sensor, a magnetoresistor, a fluxgate sensor, a superconducting quantum interference device (SQUID) sensor, a resonant sensor, an induction magnetometer, a reed contact sensor, and Wiegand wire sensor.

In further features, the battery cell is a pouch cell.

In further features, the battery cell is a prismatic cell.

In a feature, the present disclosure includes a system for measuring dilation in a coin cell battery. The system has a coin cell holder configured to hold the coin cell battery. A magnet is mounted adjacent to the coin cell holder such that the magnet is spaced apart from the coin cell battery seated in the coin cell holder. A force sensor is in cooperation with the magnet and configured to measure magnetic force strength between the magnet and a magnetic spacer within the coin cell battery. A translation stage is configured to support the force sensor. A control module is in communication with the force sensor. The control module is configured to measure degree of dilation of the coin cell battery based on change in the magnetic force strength measured by the sensor between the external magnet and the magnetic spacer. The magnetic force strength between the magnet and the magnetic spacer changes as an electrode of the coin cell battery expands during dilation and moves the magnetic spacer relative to the magnet.

In further features, the magnet is one of a spherical magnet, a hemispherical magnet, and a conical magnet.

In further features, the force sensor includes one of a load cell, a strain gauge, and a pressure sensor.

In further features, the coin cell holder is configured to hold the coin cell battery as the coin cell battery actively discharges energy, and the control module is configured to measure the degree of dilation of the electrode as the coin cell battery is actively discharging energy.

In further features, a micrometer is configured to adjust a height of the translation stage, which adjusts position of the magnet relative to the coin cell battery.

In further features, a stand includes the coin cell holder, the magnet, the force sensor, and the translation stage.

In a feature, the present disclosure includes a system for measuring dilation in a coin cell battery. The system includes a housing of the coin cell battery, a first electrode within the housing, a second electrode within the housing, and a separator in the housing between the first electrode and the second electrode. A magnetic spacer is within the housing adjacent to the second electrode. Expansion of at least one of the first electrode and the second electrode during dilation moves the magnetic spacer within the housing. A biasing member is in the housing between the magnetic spacer and an inner surface of the housing. The biasing member holds the magnetic spacer against the second electrode and is flexible to accommodate movement of the magnetic spacer during dilation. An external magnet is outside of the housing and spaced apart from the housing. A sensor is configured to measure magnetic force strength between the external magnet and the magnetic spacer. A control module is in communication with the sensor. The control module is configured to measure degree of dilation of the coin cell battery based on change in the magnetic force strength measured by the sensor between the external magnet and the magnetic spacer. The magnetic force strength between the external magnet and the magnetic spacer changes as at least one of the first electrode and the second electrode expands during dilation and moves the magnetic spacer relative to the external magnet.

In further features, the external magnet is one of a spherical magnet, a hemispherical magnet, and a conical magnet.

In further features, the sensor is a force sensor.

In further features, the force sensor includes one of a load cell, a strain gauge, and a pressure sensor.

In further features, the sensor and the external magnet are included with one of a Hall sensor, a magnetoresistor, a fluxgate sensor, a superconducting quantum interference device (SQUID) sensor, a resonant sensor, an induction magnetometer, a reed contact sensor, Wiegand wire sensor, and a magnetic force sensor.

In further features, the magnetic spacer includes a ferritic stainless steel magnet or a permanent magnet.

In further features, the control module is configured to measure the degree of dilation of the coin cell battery as the coin cell battery is actively discharging energy.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
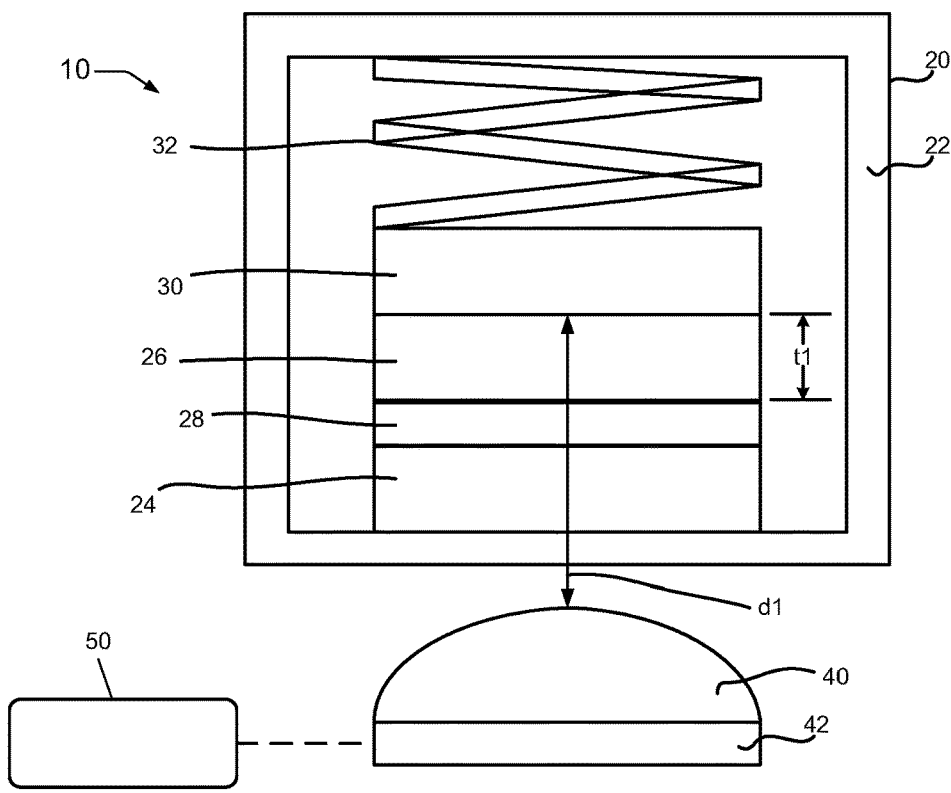
FIG. 1A illustrates an exemplary system in accordance with the present disclosure for measuring real-time dilation of a coin cell battery, the coin cell battery illustrated in a non-dilated state.
Figure 1B:
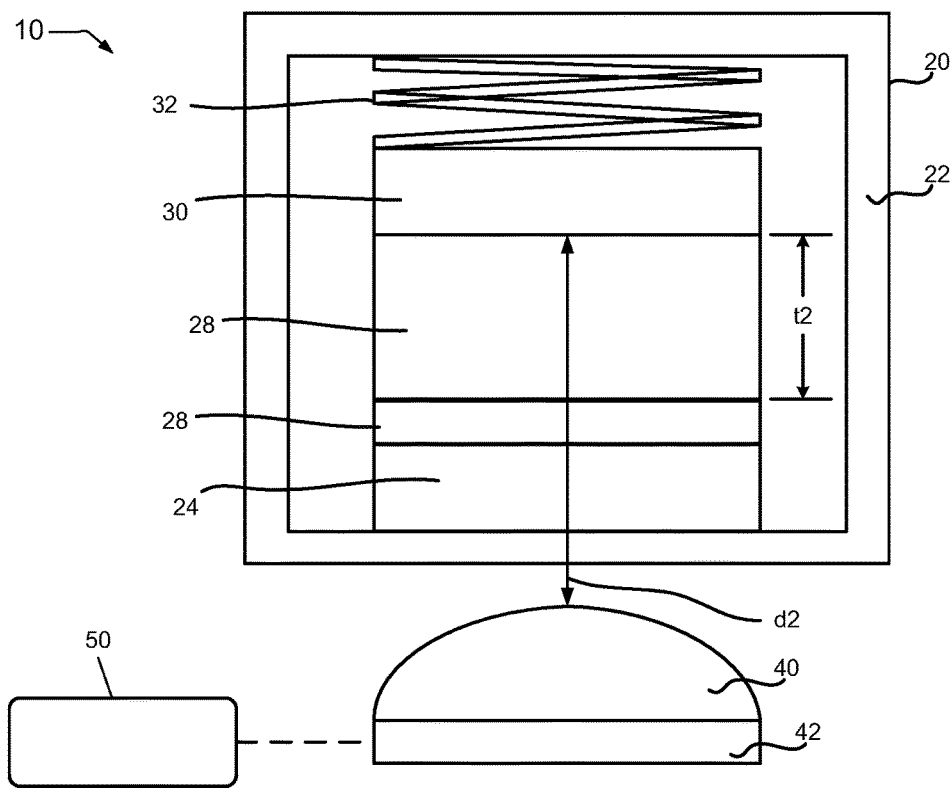
FIG. 1B is similar to FIG. 1A, but illustrates the coin cell battery in a dilated state.

FIGS. 1A and 1B illustrate an exemplary system 10 for measuring battery dilation in real time. The system 10 includes a battery cell, which in this example is a lithium ion coin cell battery 20. The coin cell battery 20 includes a housing 22. Within the housing 22 is a first electrode 24, a second electrode 26, and any suitable separator 28 therebetween. Adjacent to the second electrode 26 is a magnetic spacer 30. The magnetic spacer 30 may be, or may include, any suitable permanent magnet, electromagnet, or ferromagnetic material, for example. The magnetic spacer 30 is arranged to move within the housing 22 as the second electrode 26 expands during dilation of the coin cell battery 20. Between the magnetic spacer 30 and an inner surface of the housing 22 is any suitable biasing member, such as a spring 32. The spring 32 holds the magnetic spacer 30 against the second electrode 26, and is flexible to accommodate movement of the magnetic spacer 30 as the first electrode 24 and/or the second electrode 26 expand during dilation.

The system 10 further includes an external magnet 40, which is arranged outside of the housing 22 of the coin cell battery 20 and spaced apart from the housing 22. The external magnet 40 may be a hemispherical magnet, a spherical magnet, a conical magnet, a cylindrical magnet, a square magnet, a rectangular magnet, or any other suitable magnet. The external magnet 40 and the magnet spacer 30 are arranged within each other's magnetic fields.

The system 10 also includes a sensor 42, which is configured to measure magnetic force strength between the external magnet 40 and the magnetic spacer 30. The sensor 42 may be any suitable force sensor, such as a load cell sensor, a strain gauge sensor, a pressure sensor, etc. In some applications, the external magnet 40 and the sensor 42 may be replaced with a Hall sensor, a magnetoresistor, a fluxgate sensor, a superconducting quantum interference device (SQUID) sensor, a resonant sensor, an induction magnetometer, a reed contact sensor, a Wiegand wire sensor, or a magnetic force sensor.

In communication with the sensor 42 is a control module 50. The control module 50 is configured to measure the degree of dilation of the coin cell battery 20 based on changes in the magnetic force strength between the external magnet 40 and the magnetic spacer 30 as either of the first and second electrodes 24, 26 expand during dilation, which moves the magnetic spacer 30 relative to the external magnet 40. For example, FIG. 1A illustrates the coin cell battery 20 in a non-dilated state with the external magnet 40 spaced apart from the magnetic spacer 30 at a distance d1, and the second electrode 26 having a thickness t1. FIG. 1B illustrates the coin cell battery 20 in a dilated state, in which the thickness of the second electrode 26 has increased from t1 to t2. As the second electrode 26 (and/or the first electrode 24) increases in thickness, the magnetic spacer 30 is moved further away from the external magnet 40. For example, in the non-dilated state of FIG. 1A, the magnetic spacer 30 is at a distance d1 from the external magnet 40. In the dilated state of FIG. 1B, the second electrode 26 is at a distance d2 from the external magnet 40, which is greater than the distance d1. At distance d2, the magnetic attraction between the external magnet 40 and the magnetic spacer 30 is less than at distance d1.

The control module 50 includes, or has access to, a memory module to which is saved a calibration table. The calibration table includes the known magnetic force strength between the external magnet 40 and the magnetic spacer 30 at numerous known distances d. Using the calibration table, the control module 50 identifies the distance d2 between external magnet 40 and the second electrode 26 corresponding to the magnetic strength measured by the sensor 42. The distance d2 represents the degree to which the second electrode 26 (and/or the first electrode 24) has expanded during dilation. This information can be used for a variety of different purposes. For example, knowing the degree to which the coin cell battery 20 has dilated after a particular number of charge/discharge cycles and under various conditions can be useful for designing batteries that are less susceptive to electrode dry out and have increased cell life. The information may also be used to facilitate cell engineering, estimate energy density, and for designing various battery modules and packs. An exemplary calibration procedure is explained in further detail herein.

Figure 2:
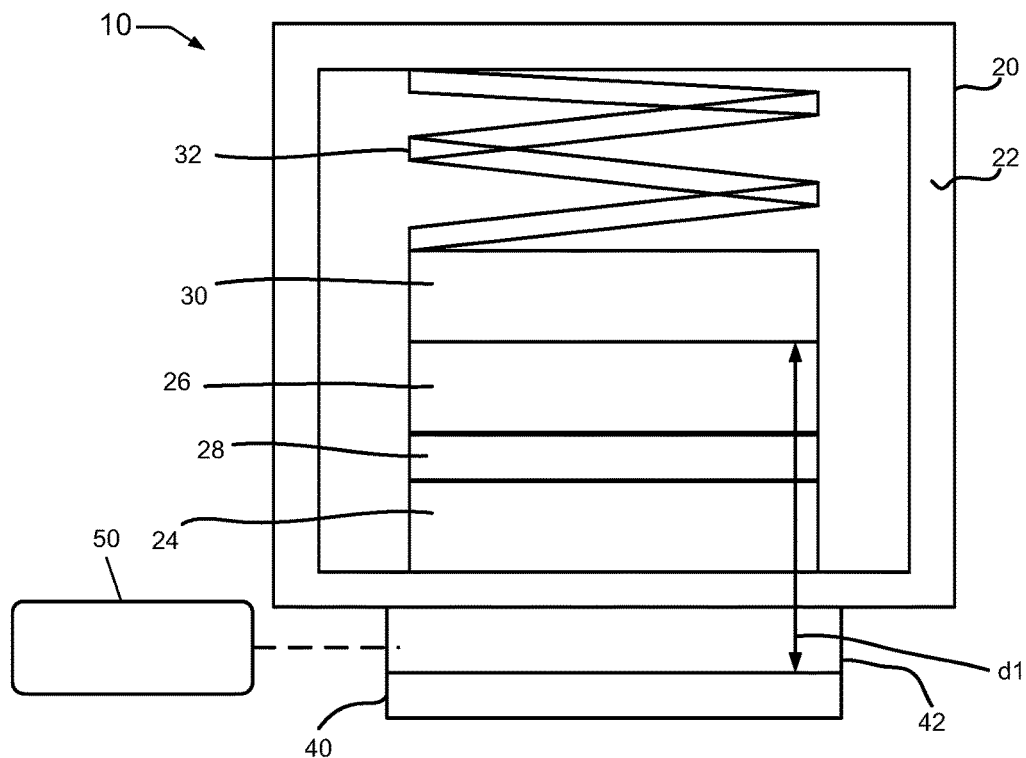
FIG. 2 illustrates another exemplary system in accordance with the present disclosure for measuring real-time dilation of a coin cell battery.

Various modifications may be made to the system 10 and still fall within the scope of the present disclosure. For example, FIG. 2 illustrates the system 10 modified with the sensor 42 between the magnet 40 and the housing 22. The sensor 42 may be in direct contact with the housing, and may be a pressure sensor. The magnetic spacer 30 is configured as a ferromagnetic spacer in this example. The external magnet 40 may be a square or rectangular magnet, for example.

Figure 3:
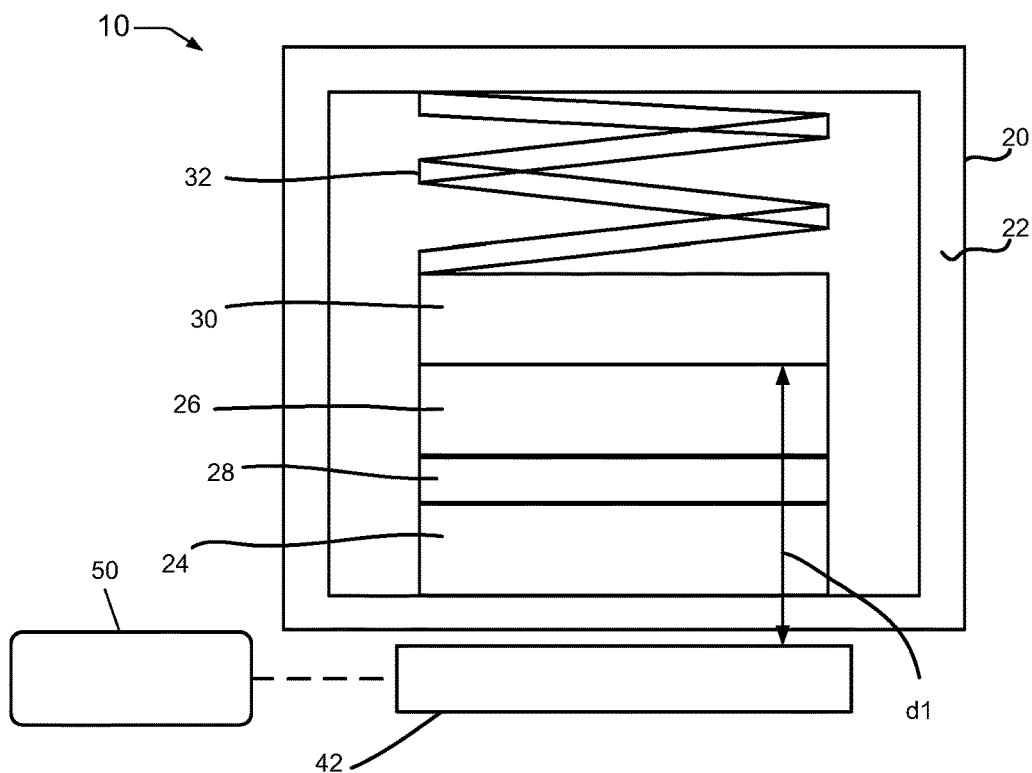
FIG. 3 illustrates an additional exemplary system in accordance with the present disclosure for measuring real-time dilation of a coin cell battery.
Figure 4:
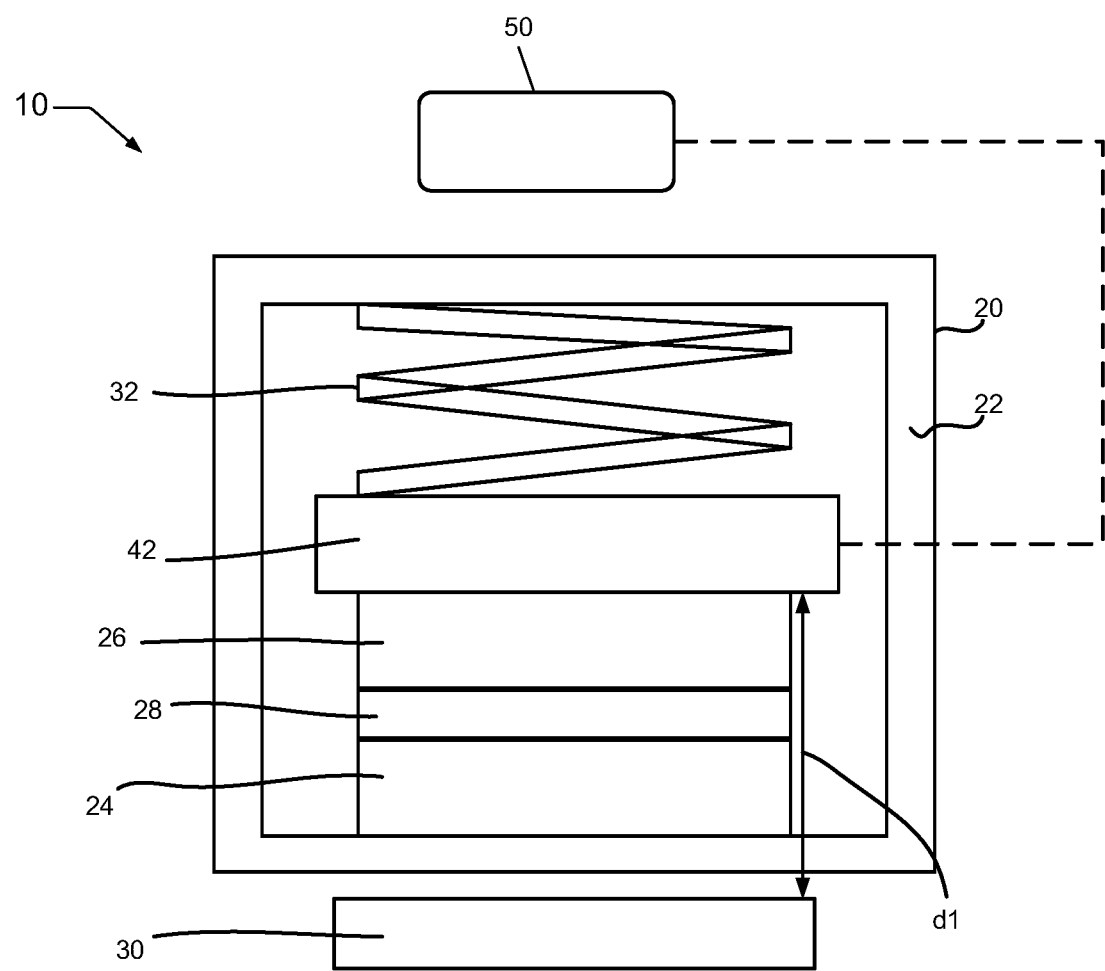
FIG. 4 illustrates another exemplary system in accordance with the present disclosure for measuring real-time dilation of a coin cell battery.
Figure 5:
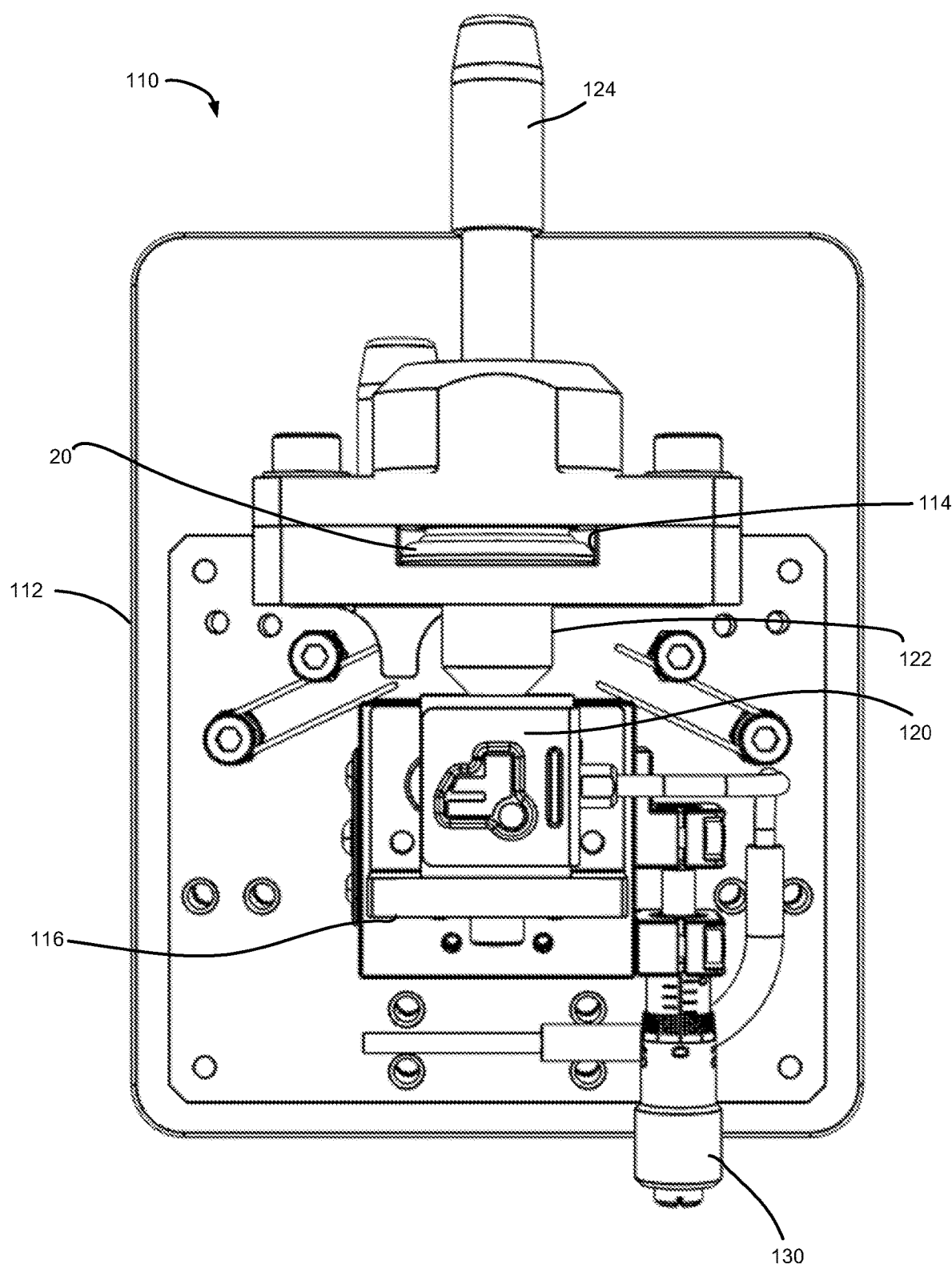
FIG. 5 is a plan view of a dilatometer in accordance with the present disclosure for measuring real-time dilation of a coin cell battery.
Figure 6:
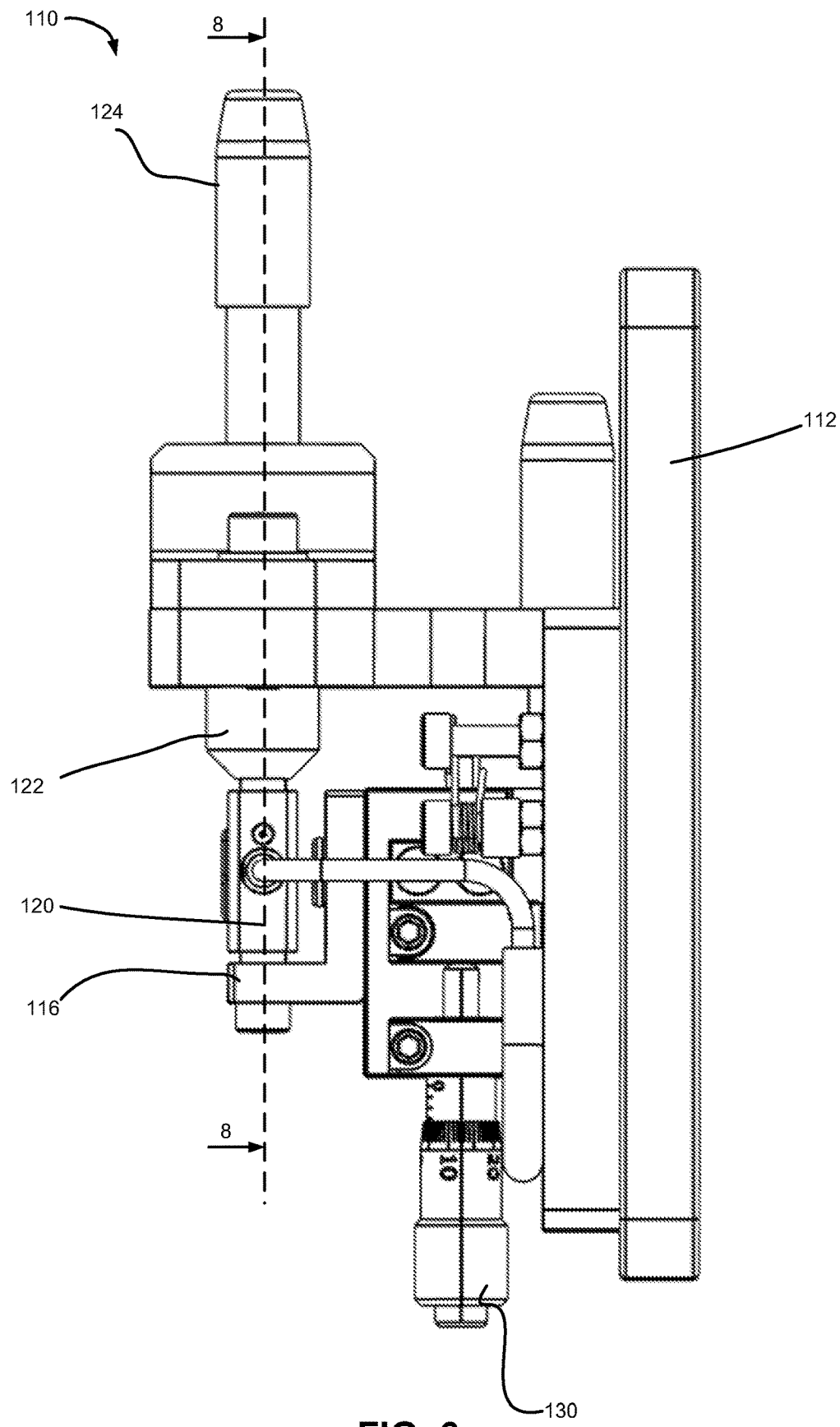
FIG. 6 is a side view of the dilatometer of FIG. 5.
Figure 7:
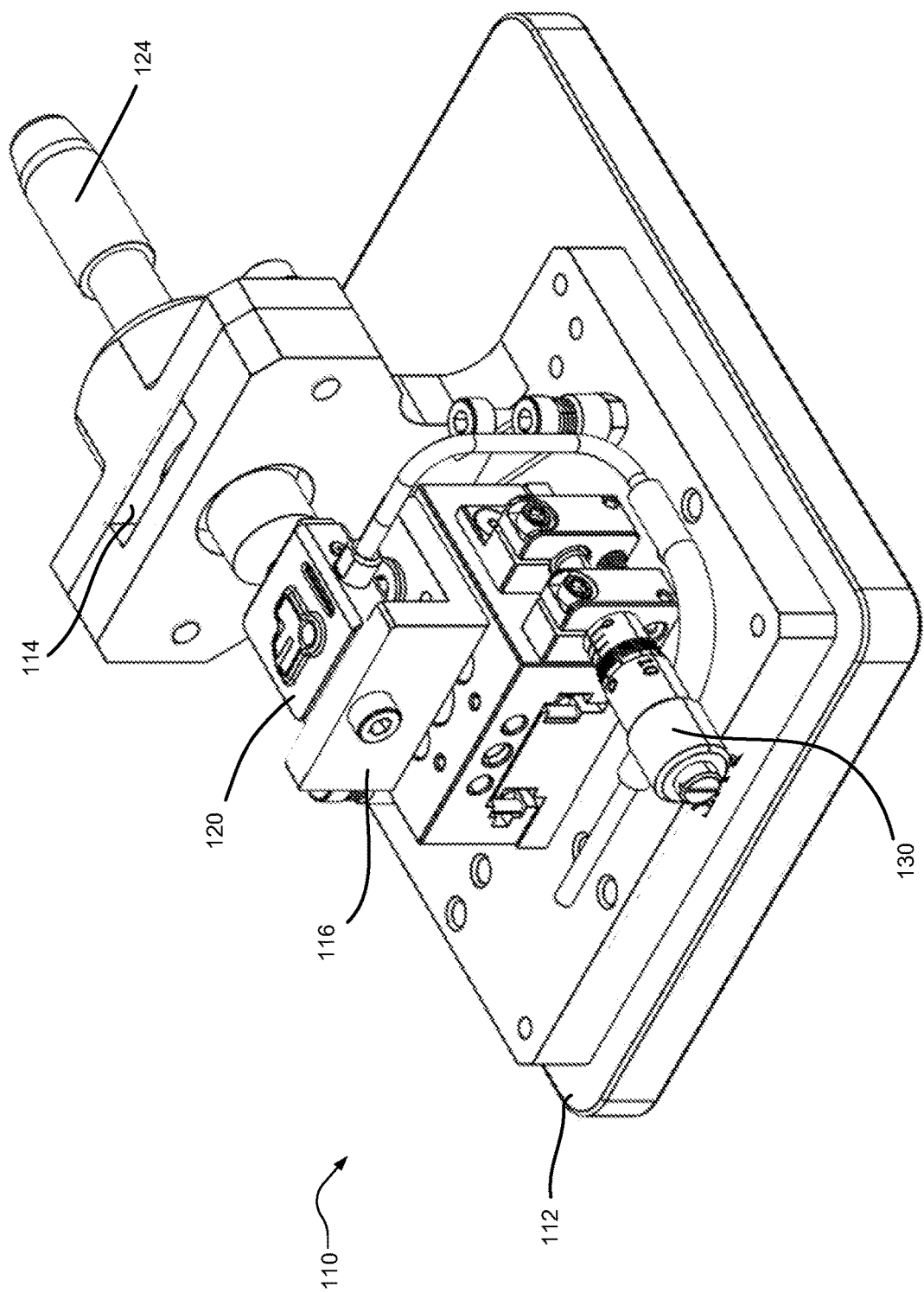
FIG. 7 is a perspective view of the dilatometer of FIG. 5.

FIG. 3 illustrates the system 10 modified such that the sensor 42 is a magnetic sensor, which may include one of the following, for example: a Hall sensor, a magnetoresistor, a fluxgate sensor, a superconducting quantum interference device (SQUID) sensor, a resonant sensor, an induction magnetometer, a reed contact sensor, a Wiegand wire sensor, or a magnetic force sensor. In the configuration of FIG. 3, the magnetic sensor 42 is spaced apart from the housing 22. The configuration of FIG. 4 is similar to that of FIG. 3, but the positions of the sensor 42 and the magnetic spacer 30 are reversed. Thus, in the configuration of FIG. 4, the sensor 42 is within the housing 20 between the second electrode 26 and the biasing member 32, and the magnet 30 is outside of the housing 22 spaced apart from an outer surface of the housing 22.

With reference to FIGS. 5-8, the present disclosure further includes a dilatometer 110. The dilatometer 110 is configured to measure dilation of any suitable battery cell in real time as the cell is charged and discharged. For example, the dilatometer 110 is configured to measure real time dilation of the coin cell battery 20 of FIGS. 1A, 1B, 2, 3, and 4. The dilatometer 110 includes a stand 112 to which a coin cell holder 114 is mounted. The coin cell holder 114 is configured to hold the coin cell battery 20, or any other suitable coin cell battery, such that leads may be connected to the battery 20 for charging and discharging the battery 20. Also mounted to the stand 112 is a translation stage 116, which supports any suitable force sensor, such as a load cell 120. The load cell 120 may be any suitable load cell, such as a Miniature S-Bear Jr. Load Cell 2.0 (Model LSB201) from Futek Advanced Sensor Technology, Inc. of Irvine, CA. The dilatometer 110 includes a micrometer 130 for adjusting the vertical height of the translation stage 116, which also adjusts the vertical position of the load cell 120 seated on the translation stage.

Figure 8:
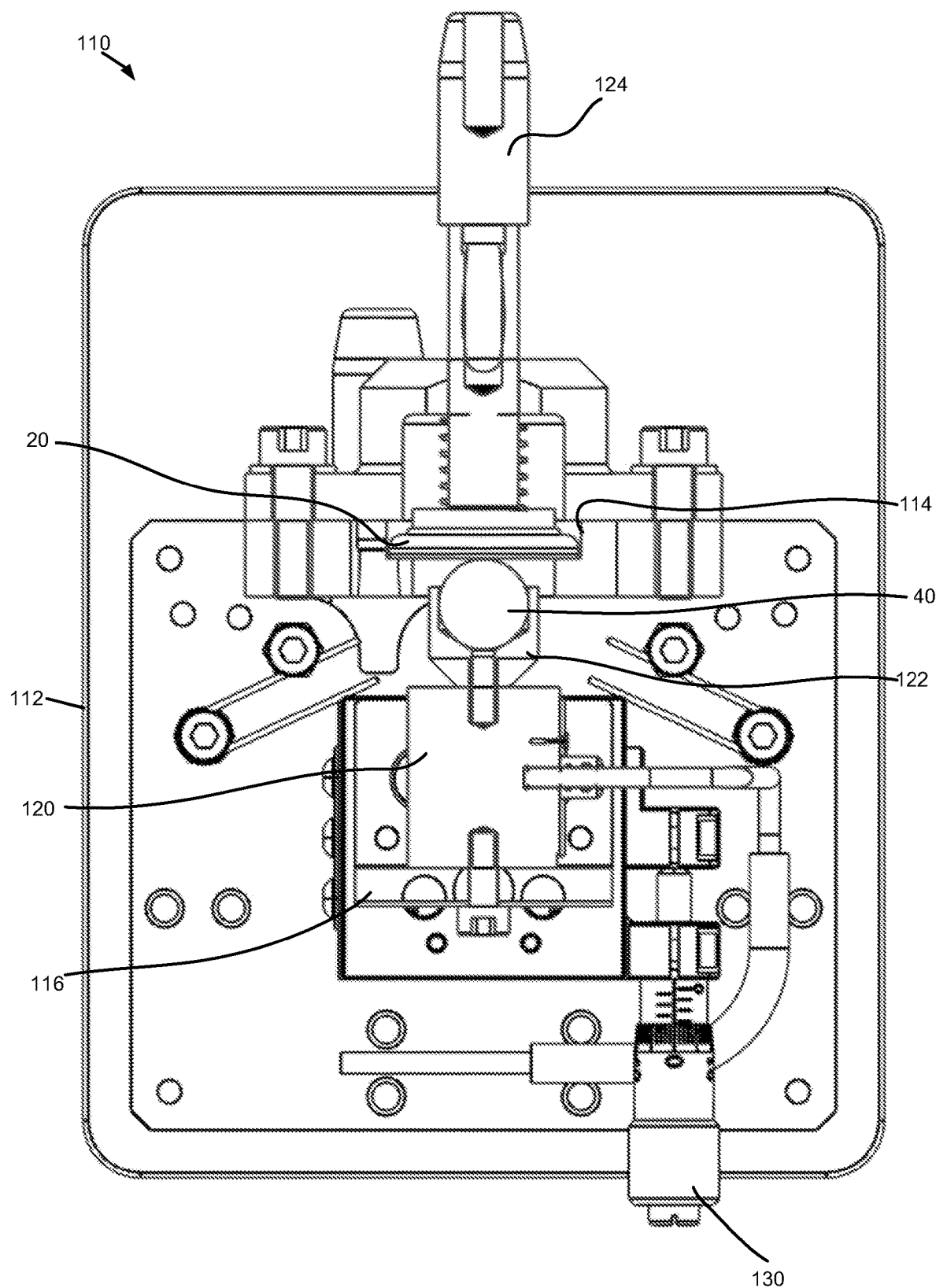
FIG. 8 is a cross-sectional view taken along line 8-8 of FIG. 6.

Seated on the load cell 120 is a magnet holder 122. As illustrated in FIG. 8, the magnet holder 122 is configured to hold the external magnet 40. In the example of FIG. 8, the external magnet 40 is a spherical magnet. The magnet holder 122 may be configured to hold the external magnet 40 having any other suitable shape as well. The coin cell battery 20 is supported in the coin cell holder 114 between the external magnet 40 and a compression member 124, which holds the coin cell battery 20 in place.

Figure 12:
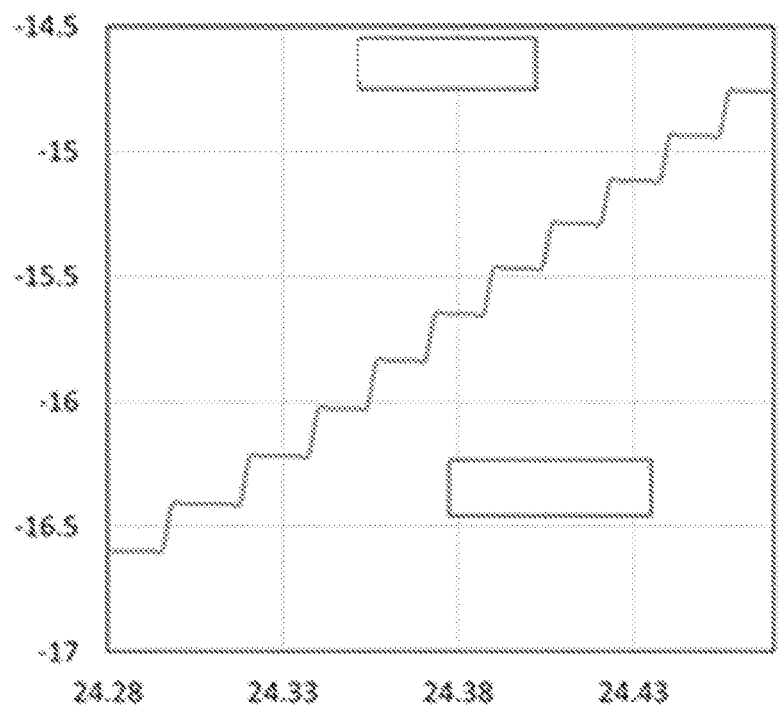
FIG. 12 illustrates exemplary calibration data for calibration of an exemplary system in accordance with the present disclosure for measuring real-time dilation of a battery cell.
Figure 13:
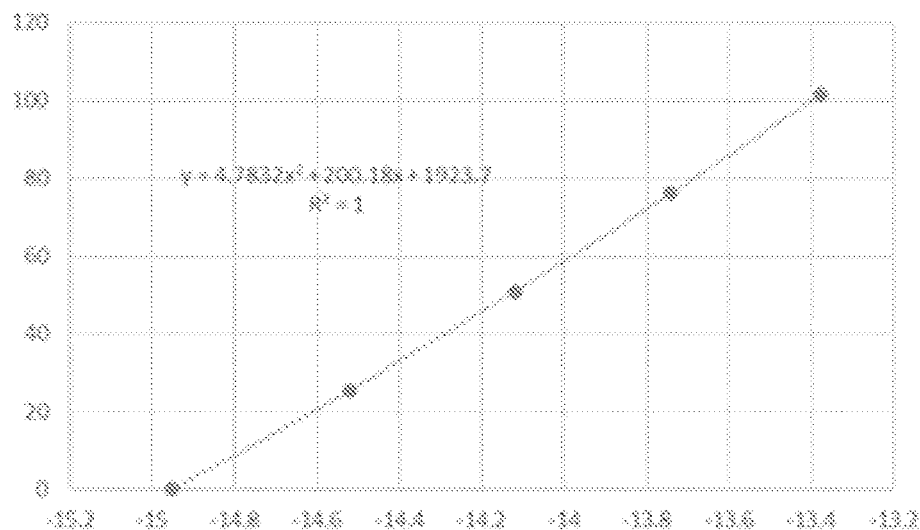
FIG. 13 illustrates additional calibration data for measuring real-time dilation of a battery cell.

The dilatometer 110 may be used to calibrate the control module 50 and establish the calibration table described above. For example, the calibration table may be established as follows. Using the micrometer 130, the translation stage 116 is raised, which raises the external magnet 40. The translation stage 116 is raised until the magnetic strength measured by the load cell 120 between the external magnet 40 and the magnetic spacer 30 begins to drop. The magnetic strength will increase until the magnet 40 touches the housing 22, at which point the magnetic strength reading will begin to drop. The translation stage 116 is then adjusted up and down until the force on the load cell 120 is maximized. Once the force on the load cell 120 is maximized, the control module 50 is configured to start recording the load cell data at any suitable intervals. For example, the control module 50 can be configured to record one or two readings per second. The translation stage 116 is then lowered at least three times in 50 μm increments while recording about 5-10 readings per step adjustment. Next, the translation stage 116 is raised back to the starting point in 50 μm increments while recording about 5-10 readings per step. FIG. 12 illustrates an exemplary calibration recording in 10 μm steps. The translation stage 116 is then lowered 50 μm, locked in place, and recording of the calibration data is stopped. The stable readings at each step of the translation stage 116 are averaged by the control module 50. The control module 50 plots micrometer translation as a function of the average load cell reading, and calculates the calibration curve and $R^2$ for the best fit mathematical function, such as a linear or a polynomial function (with $R^2$ being greater than 0.99), as illustrated in FIG. 13, for example.

After calibration, the dilatometer 110 may be used to measure real time dilation of the coin cell battery 20, or any other suitable battery, as the battery 20 is run through charge and discharge cycles. Cycler leads are connected to the dilatometer 110 for cycling the coin cell battery 20. The control module 50 can be configured to record data from the load cell 120 at any suitable time increments, such as 5 second increments, for example.

Figure 9:
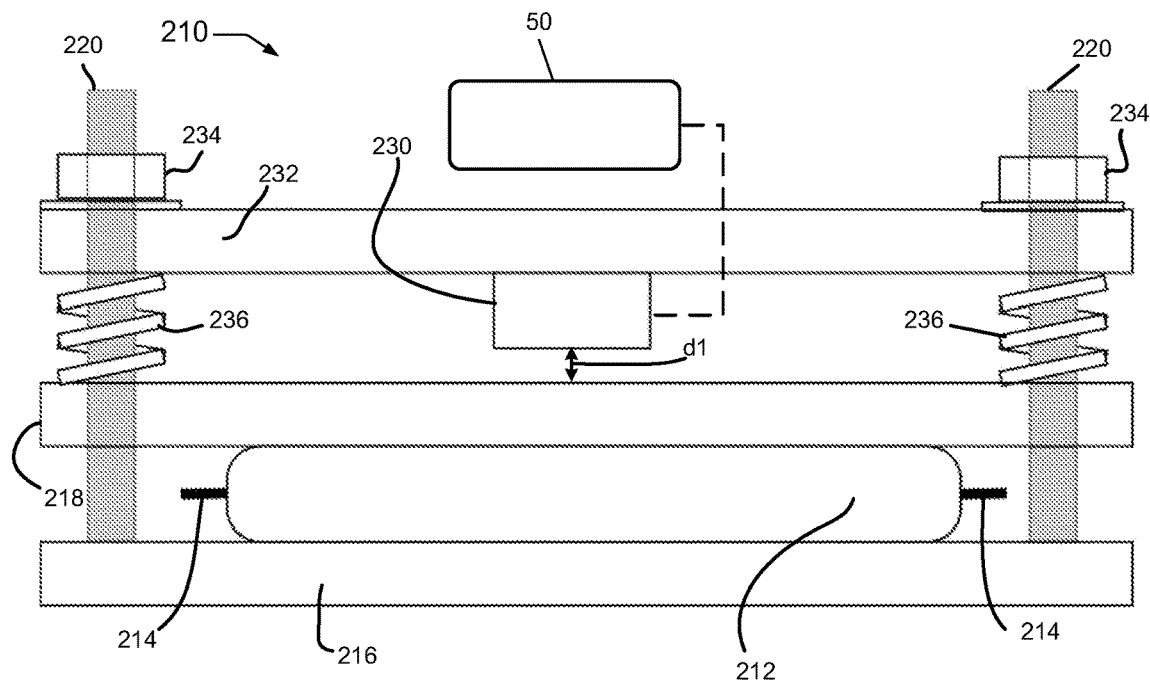
FIG. 9 illustrates an exemplary system in accordance with the present disclosure for measuring real-time dilation of a pouch cell battery.

With reference to FIG. 9, the present disclosure also includes a system 210 for measuring battery dilation of a pouch cell battery 212. The pouch cell battery 212 includes battery terminals 214, and is seated on a fixed plate 216. The pouch cell battery 212 is between the fixed plate 216 and a magnet in the form of a floating compression plate 218. The plate 218 may be made of any suitable magnetic material (e.g., steel), or have a magnet or magnetic material embedded in or attached to a surface of the plate 218. The plate 218 is arranged on supports 220. Opposite to the plate 218 is a sensor 230 configured to sense magnetic force, such as a magnetic field sensor or a load cell (e.g., the load cell 120). The sensor 230 is mounted to a fixed plate 232, and thus the sensor 230 is stationary. The sensor 230 is in communication with the control module 50. The fixed plate 232 is mounted to the supports 220 and fixed in position by fasteners 234. Between the fixed plate 232 and the plate 218 are springs 236 for accommodating movement of the plate 218 during dilation.

As the pouch cell 212 expands during dilation, the distance d1 between the sensor 230 and the plate 218 decreases, and the strength of the magnetic field between the plate 218 and the sensor 230 changes. The control module 50 is configured to measure the degree of dilation of the pouch cell 212 based on the change in the magnetic force strength between the plate 218 and the sensor 230. The system 210 may be calibrated as explained above with respect to calibration of the coin cell battery 20, but modified to account for the distance d1 decreasing during dilation instead of increasing. The system 210 may be calibrated in any other suitable manner that correlates a measured magnetic field strength between the plate 218 and the sensor 230 with a degree to which the pouch cell 212 has dilated.

Figure 10:
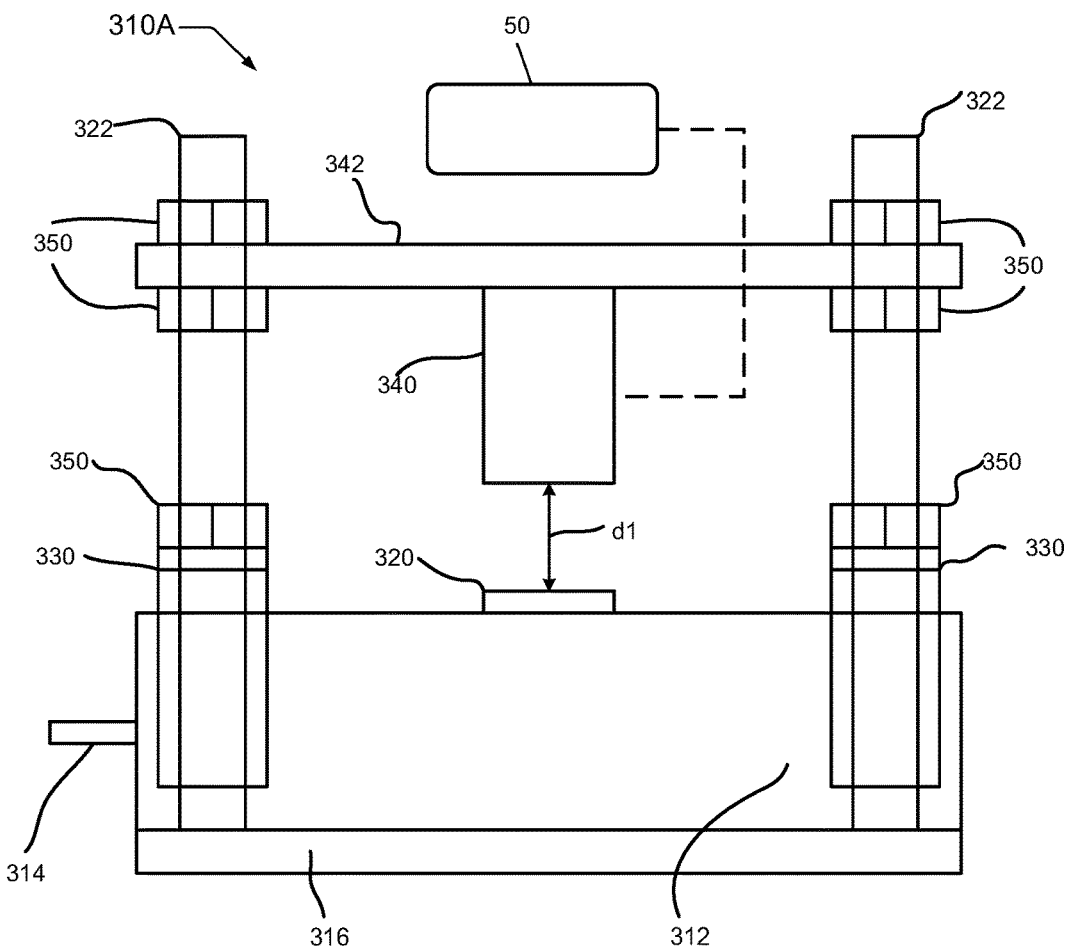
FIG. 10 illustrates an exemplary system in accordance with the present disclosure for measuring real-time dilation of a prismatic cell battery.

With reference to FIG. 10, the present disclosure also includes a system 310A for measuring battery dilation of a prismatic cell battery 312. The prismatic cell battery 312 includes a battery terminal 314, and is mounted to a fixed plate 316. Mounted to the prismatic cell battery 312 is a magnet 320. Extending from the plate 316 are supports 322 to which brackets 330 are mounted. The brackets 330 hold the prismatic cell battery 312 against the plate 316. During dilation, the prismatic cell 312 expands such that the magnet 320 moves towards a sensor 340 mounted to a fixed plate 342. The fixed plate 342 is rigidly secured to the supports 322 with fasteners 350. The sensor 340 is in communication with the control module 50.

The sensor 340 is configured to sense magnetic force. The sensor 340 may be a magnetic field sensor or a load cell (e.g., the load cell 120), for example. As the prismatic cell battery 312 expands during dilation, the distance d1 between the magnet 320 and the sensor 340 decreases, and the strength of the magnetic field between magnet 320 and the sensor 340 changes. The control module 50 is configured to measure the degree of dilation of the prismatic cell battery 312 based on the change in the magnetic force strength between the magnet 320 and the sensor 340. The system 310A is first calibrated, such as in the manner explained above with respect to the coin cell battery 20, but modified to account for the distance d1 decreasing during dilation instead of increasing. The system 310A may alternatively be calibrated in any other suitable manner that correlates a measured magnetic field strength between the magnet 320 and the sensor 340 with a degree to which the prismatic cell battery 312 has dilated.

Figure 11:
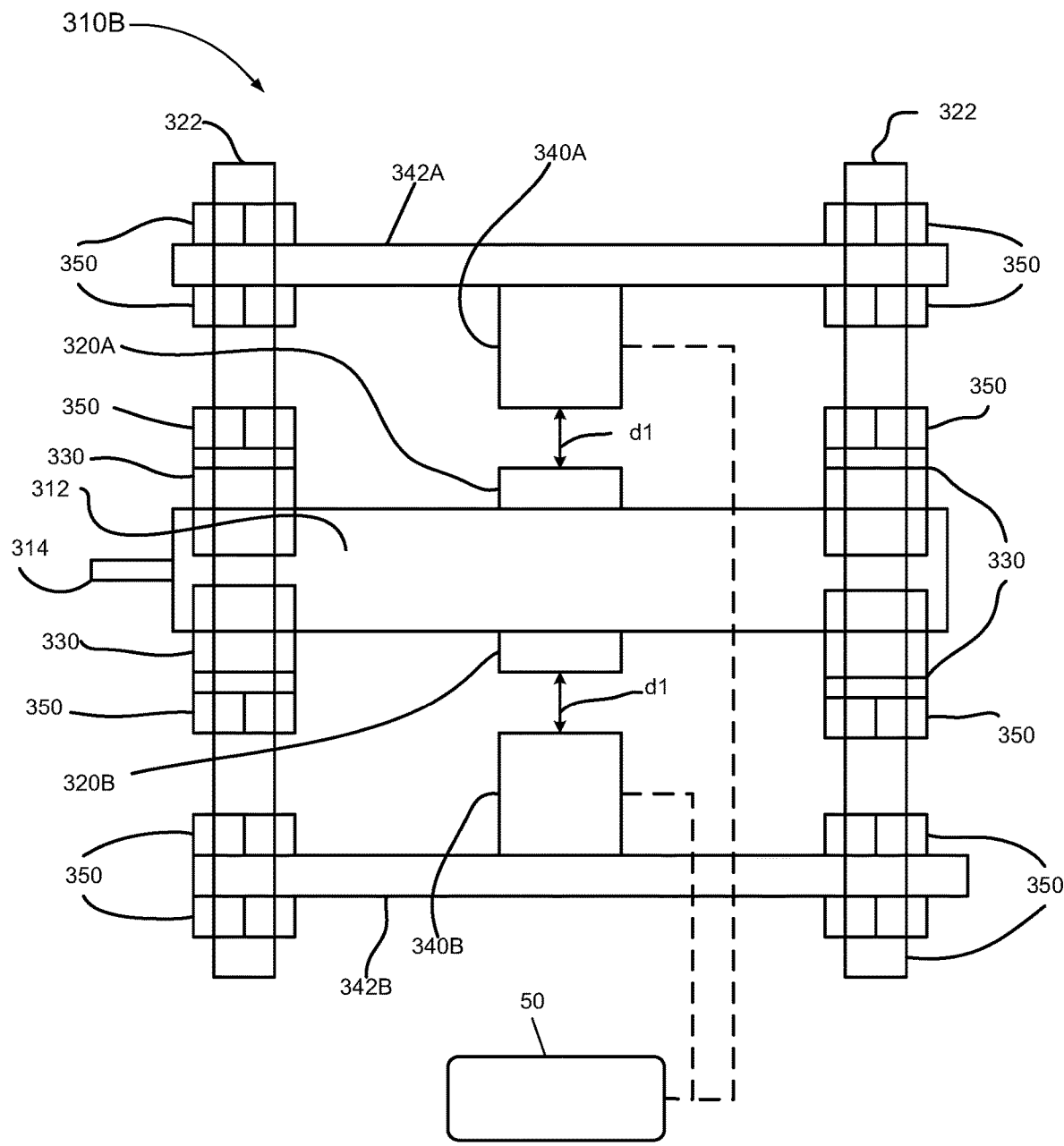
FIG. 11 illustrates another exemplary system in accordance with the present disclosure for measuring real-time dilation of a prismatic cell battery.

The system 310B of FIG. 11 is similar to the system 310A of FIG. 10. But in the system 310B, the prismatic cell battery 312 is mounted so that during dilation the prismatic cell battery 312 is able to expand on two opposite sides, such as top and bottom sides (or front and rear sides). To measure such expansion on the two sides, a magnet 320A is arranged on one side of the prismatic cell battery 312 and a magnet 320B is arranged on an opposite side. Opposite to the magnet 320A is a sensor 340A. Opposite to the magnet 320B is a sensor 340B. The sensor 340A measures changes in magnetic force strength with the magnet 320A. The sensor 340B measures changes in magnetic force strength with the magnet 320B. The system 310B is first calibrated, such as in the manner explained above with respect to the coin cell battery 20, but modified to account for the distances d1 decreasing during dilation instead of increasing. The system 310B may alternatively be calibrated in any other suitable manner that correlates measured magnetic field strength between the magnet 320A and the sensor 340A, and/or between the magnet 320B and the sensor 340B, with a degree to which the prismatic cell battery 312 has dilated.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for measuring battery dilation, the system comprising:
    a battery cell, the battery cell is a coin cell including a housing, within the housing is a first electrode, a second electrode and a separator between the first electrode and the second electrode;
    a magnet and a magnetic force sensor, one of the magnet and the magnetic force sensor moves in response to expansion of the battery cell during dilation of the battery cell, the other of the magnet and the magnetic force sensor is stationary relative to the battery cell, the magnetic force sensor configured to sense a change in magnetic force strength between the magnet and the magnetic force sensor;
    a biasing member is between the magnet and an inner surface of the housing, the biasing member holds the magnet against the second electrode and is flexible to accommodate movement of the magnet as at least one of the first electrode and the second electrode expands during dilation; and
    a control module in communication with the magnetic force sensor, the control module configured to measure degree of dilation of the battery cell based on the change in the magnetic force strength between the magnet and the magnetic force sensor;
    wherein:
        the magnetic force strength between the magnet and the magnetic force sensor changes as the battery cell expands during dilation;
        the magnetic force sensor is external to the housing; and
        the magnet is adjacent to the second electrode and configured to move away from the magnetic force sensor as at least one of the first electrode and the second electrode expands during dilation.

2. The system of claim 1, wherein the magnetic force sensor includes one of a spherical magnet, a hemispherical magnet, and a conical magnet.

3. The system of claim 2, wherein the magnetic force sensor further includes one of a load sensor, a strain gauge, a pressure sensor, an electromagnetic force restoration sensor.

4. The system of claim 1, wherein the magnetic force sensor includes one of a Hall sensor, a magnetoresistor, a fluxgate sensor, a superconducting quantum interference device (SQUID) sensor, a resonant sensor, an induction magnetometer, a reed contact sensor, and Wiegand wire sensor.

5. A system for measuring dilation in a coin cell battery, the system comprising:
    a coin cell holder configured to hold the coin cell battery;
    a magnet mounted adjacent to the coin cell holder such that the magnet is spaced apart from the coin cell battery seated in the coin cell holder;
    a force sensor in cooperation with the magnet and configured to measure magnetic force strength between the magnet and a magnetic spacer within the coin cell battery;
    a translation stage configured to support the force sensor; and
    a control module in communication with the force sensor, the control module configured to measure degree of dilation of the coin cell battery based on change in the magnetic force strength measured by the sensor between the magnet and the magnetic spacer;

wherein the magnetic force strength between the magnet and the magnetic spacer changes as an electrode of the coin cell battery expands during dilation and moves the magnetic spacer relative to the magnet.

6. The system of claim 5, wherein the magnet is one of a spherical magnet, a hemispherical magnet, and a conical magnet.

7. The system of claim 5, wherein the force sensor includes one of a load cell, a strain gauge, and a pressure sensor.

8. The system of claim 5, wherein the coin cell holder is configured to hold the coin cell battery as the coin cell battery actively discharges energy; and
wherein the control module is configured to measure the degree of dilation of the electrode as the coin cell battery is actively discharging energy.

9. The system of claim 5, further comprising a micrometer configured to adjust a height of the translation stage, which adjusts position of the magnet relative to the coin cell battery.

10. The system of claim 5, further comprising a stand including the coin cell holder, the magnet, the force sensor, and the translation stage.

11. A system for measuring dilation in a coin cell battery, the system comprising:
a housing of the coin cell battery;
a first electrode within the housing;
a second electrode within the housing;
a separator in the housing between the first electrode and the second electrode;
a magnetic spacer within the housing adjacent to the second electrode, expansion of at least one of the first electrode and the second electrode during dilation moves the magnetic spacer within the housing;
a biasing member in the housing between the magnetic spacer and an inner surface of the housing, the biasing member holds the magnetic spacer against the second electrode and is flexible to accommodate movement of the magnetic spacer during dilation;
an external magnet outside of the housing and spaced apart from the housing;
a sensor configured to measure magnetic force strength between the external magnet and the magnetic spacer; and
a control module in communication with the sensor, the control module configured to measure degree of dilation of the coin cell battery based on change in the magnetic force strength measured by the sensor between the external magnet and the magnetic spacer;
wherein the magnetic force strength between the external magnet and the magnetic spacer changes as at least one of the first electrode and the second electrode expands during dilation and moves the magnetic spacer relative to the external magnet.

12. The system of claim 11, wherein the external magnet is one of a spherical magnet, a hemispherical magnet, and a conical magnet.

13. The system of claim 11, wherein the sensor is a force sensor.

14. The system of claim 13, wherein the force sensor includes one of a load cell, a strain gauge, and a pressure sensor.

15. The system of claim 11, wherein the sensor and the external magnet are included with one of a Hall sensor, a magnetoresistor, a fluxgate sensor, a superconducting quantum interference device (SQUID) sensor, a resonant sensor, an induction magnetometer, a reed contact sensor, Wiegand wire sensor, and a magnetic force sensor.

16. The system of claim 11, wherein the magnetic spacer includes a ferritic stainless steel magnet or a permanent magnet.

17. The system of claim 11, wherein the control module is configured to measure the degree of dilation of the coin cell battery as the coin cell battery is actively discharging energy.

\* \* \* \* \*